(12) United States Patent
Yajima

(10) Patent No.: US 11,993,716 B2
(45) Date of Patent: May 28, 2024

(54) RUBBER COMPOSITION AND TIRE

(71) Applicant: SUMITOMO RUBBER INDUSTRIES, LTD., Kobe (JP)

(72) Inventor: Ryo Yajima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 12 days.

(21) Appl. No.: 17/851,763

(22) Filed: Jun. 28, 2022

(65) Prior Publication Data

US 2023/0043699 A1     Feb. 9, 2023

(30) Foreign Application Priority Data

Jul. 26, 2021   (JP) .................................. 2021-121364
Jun. 8, 2022   (JP) .................................. 2022-092860

(51) Int. Cl.
    *C08L 91/00*          (2006.01)
    *B60C 1/00*           (2006.01)

(52) U.S. Cl.
    CPC ............ *C08L 91/00* (2013.01); *B60C 1/0008* (2013.01); *B60C 1/0025* (2013.01)

(58) Field of Classification Search
    CPC ...... C08L 91/00; B60C 1/0008; B60C 1/0025
    See application file for complete search history.

(56) References Cited

U.S. PATENT DOCUMENTS

| 2003/0100661 A1 | 5/2003 | Kikuchi et al. |
| 2005/0236084 A1 | 10/2005 | Kikuchi et al. |
| 2007/0240810 A1 | 10/2007 | Kikuchi et al. |

FOREIGN PATENT DOCUMENTS

| JP | 2003-63206 A | 3/2003 |

*Primary Examiner* — Angela C Scott
(74) *Attorney, Agent, or Firm* — Birch, Stewart, Kolasch & Birch, LLP

(57) ABSTRACT

Provided are a rubber composition having excellent overall performance in terms of fuel economy and bleed resistance as well as good LCA performance (e.g., reduction of $CO_2$ emissions), and a tire including the composition. A rubber composition containing a plant oil satisfying the conditions (1)-(4): (1) it is liquid at 23° C.; (2) it has a GPC weight-average molecular weight of more than 800; (3) when it is 3-fold diluted with THF, it satisfies the following relationship with respect to the absorbances at 450 nm and 600 nm measured with a spectrophotometer: Absorbance at 450 nm−Absorbance at 600 nm≥0.05; and (4) it satisfies the following relationship with respect to the weights before and after passing 100 g of the plant oil at 23-30° C. through 20 mesh plain weave wire cloth: (Weight after passing through plain weave wire cloth)/(Weight before passing through plain weave wire cloth)×100≥99.0.

5 Claims, No Drawings

RUBBER COMPOSITION AND TIRE

TECHNICAL FIELD

The present disclosure relates to a rubber composition and a tire.

BACKGROUND ART

Mineral oils and the like have been widely used as plasticizers or softeners for rubber. From the standpoints of fossil resource depletion in the future, environmental load, etc., however, the use of plant oils as alternatives has been proposed (see Patent Literature 1), and it has also been desirable to provide rubber compositions containing such plant oils with improved properties such as fuel economy, bleed resistance, and life cycle assessment (LCA) performance (e.g., reduction of $CO_2$ emissions).

CITATION LIST

Patent Literature

Patent Literature 1: JP 2003-63206 A

SUMMARY OF DISCLOSURE

Technical Problem

The present disclosure aims to solve the above problem and provide a rubber composition having excellent overall performance in terms of fuel economy and bleed resistance as well as good LCA performance (e.g., reduction of $CO_2$ emissions), and a tire including the rubber composition.

Solution to Problem

The present disclosure relates to a tire, including a rubber composition containing at least one plant oil, the plant oil satisfying the following conditions (1) to (4):

(1) the plant oil is liquid at a temperature of 23° C.;
(2) the plant oil has a GPC weight average molecular weight of more than 800;
(3) when the plant oil is 3-fold diluted with THF, the diluted plant oil satisfies the following relationship with respect to absorbances at wavelengths of 450 nm and 600 nm measured with a spectrophotometer:

Absorbance at wavelength of 450 nm−Absorbance at wavelength of 600 nm≥0.05; and (4) the plant oil satisfies the following relationship with respect to weights before and after passing 100 g of the plant oil at a temperature of 23 to 30° C. through 20 mesh plain weave wire cloth:

(Weight after passing through plain weave wire cloth)/(Weight before passing through plain weave wire cloth)×100≥99.0.

DESCRIPTION OF EMBODIMENTS

The present disclosure provides a rubber composition which contains at least one plant oil satisfying conditions (1) to (4). The rubber composition has excellent overall performance in terms of fuel economy and bleed resistance as well as good LCA performance (e.g., reduction of $CO_2$ emissions).

Although the mechanism for this advantageous effect is not exactly clear, it is believed to be due to the following mechanism of action.

It is considered that in a plant oil satisfying conditions (1) to (4), the carbonyl groups may be conjugated with the double bonds to cause interaction with filler such as carbon black and, moreover, as the number of double bonds is thus reduced, the plant oil has a lower Tg, so that the tan δ tends to decrease, resulting in improved fuel economy. It is also considered that, compared to mineral oils having a Mw of 200 to 700 g/mol, the plant oil having a Mw of more than 800 g/mol is less flowable in the rubber due to its higher molecular weight, resulting in further improved bleed resistance. Furthermore, from the standpoint of carbon neutrality, the use of the biomass material plant oil enables reduction of $CO_2$ emissions at the time of disposal as compared to mineral oils; in addition, when used plant oils, which exist everywhere, for example, in any domestic location, are recycled and used, it is also possible to reduce $CO_2$ emissions during the production and transportation of raw materials, resulting in high LCA performance. For these reasons, it is believed that the rubber composition has excellent overall performance in terms of fuel economy and bleed resistance as well as good LCA performance (e.g., reduction of $CO_2$ emissions).

As described above, the disclosure solves the problem (purpose) of improving overall performance in terms of fuel economy and bleed resistance as well as LCA performance (e.g., reduction of $CO_2$ emissions) by formulating a rubber composition including a plant oil satisfying conditions (1) to (4). In other words, conditions (1) to (4) do not define the problem (purpose), and the problem herein is to improve overall performance in terms of fuel economy and bleed resistance as well as LCA performance (e.g., reduction of $CO_2$ emissions). In order to provide a solution to this problem, the rubber composition has been formulated to essentially include a plant oil satisfying conditions (1) to (4).

(Plant Oil)

The use of the plant oil (plant-derived glycerol fatty acid triester) in the rubber composition is desirable in terms of life cycle assessment (LCA). Here, the term "glycerol fatty acid triester" refers to an ester of a fatty acid and glycerol, which is also called triglyceride or tri-O-acylglycerol.

The plant oil used in the rubber composition is liquid at a temperature of 23° C. (condition (1)).

This material that is liquid at 23° C. functions as a plasticizer for the rubber composition. Herein, the term "plasticizer" refers to a material that can impart plasticity to rubber components.

The plant oil has a GPC weight average molecular weight (Mw) of more than 800 (condition 2). Specifically, the plant oil has a Mw of more than 800 as determined by gel permeation chromatography (GPC) and calibrated with polystyrene standards.

The weight average molecular weight (Mw) of the plant oil determined by gel permeation chromatography is more than 800, preferably 850 or more, more preferably 900 or more, still more preferably 950 or more, particularly preferably 1000 or more. The upper limit is not limited, but is preferably 10000 or less, more preferably 5000 or less, still more preferably 4000 or less, particularly preferably 3000 or less. When the Mw is within the range indicated above, the advantageous effect tends to be better achieved.

Herein, the Mw can be determined by GPC (GPC-8000 series available from Tosoh Corporation, detector: differential refractometer, column: TSKGEL SUPERMULTIPORE HZ-M available from Tosoh Corporation) and calibrated with polystyrene standards.

To better achieve the advantageous effect, the plant oil has a GPC molecular weight distribution curve in which the peak area of components having a molecular weight of 800 or more (the percentage of components having a molecular weight of 800 or more) is preferably 90% or greater. The peak area is more preferably 95% or greater, still more preferably 97% or greater, particularly preferably 98% or greater, and may be 100%.

When the plant oil is 3-fold diluted with tetrahydrofuran (THF), the diluted plant oil satisfies the following relationship with respect to the absorbances at wavelengths of 450 nm and 600 nm measured with a spectrophotometer (the absorbances at wavelengths of 450 nm and 600 nm determined when the plant oil is 3-fold diluted with THF and the absorbance of the diluted plant oil is measured with a spectrophotometer) (condition (3)):

Absorbance at wavelength of 450 nm−Absorbance at wavelength of 600 nm≥0.05.

The value of "Absorbance at wavelength of 450 nm−Absorbance at wavelength of 600 nm" is preferably 0.10 or higher, more preferably 0.20 or higher, still more preferably 0.30 or higher, particularly preferably 0.35 or higher. The upper limit is preferably 0.90 or lower, more preferably 0.80 or lower, still more preferably 0.70 or lower, particularly preferably 0.60 or lower. When the value is within the range indicated above, the advantageous effect tends to be better achieved.

The absorbance at a wavelength of 450 nm measured with a spectrophotometer is preferably 0.10 or higher, more preferably 0.20 or higher, still more preferably 0.30 or higher, particularly preferably 0.40 or higher. The upper limit is preferably 0.90 or lower, more preferably 0.80 or lower, still more preferably 0.70 or lower, particularly preferably 0.60 or lower. When the absorbance is within the range indicated above, the advantageous effect tends to be better achieved.

Herein, the absorbance of the plant oil may be measured with an ultraviolet-visible spectrophotometer, for example. Specifically, it may be measured as described in EXAMPLES.

The plant oil satisfies the following relationship with respect to the weight (g) before passing 100 g of the plant oil at a temperature of 23 to 30° C. through 20 mesh plain weave wire cloth and the weight (g) after passing 100 g of the plant oil at a temperature of 23 to 30° C. through 20 mesh plain weave wire cloth (condition (4)):

(Weight after passing through plain weave wire cloth)/(Weight before passing through plain weave wire cloth)×100≥99.0.

The value of "(Weight after passing through plain weave wire cloth)/(Weight before passing through plain weave wire cloth)×100" is preferably 99.3% or higher, more preferably 99.5% or higher, still more preferably 99.7% or higher, particularly preferably 99.8% or higher, and may be 100%. When the value is within the range indicated above, the advantageous effect tends to be better achieved.

Here, the term "plain weave wire cloth" refers to wire cloth in which to and transverse wires pare woven so that they cross each other at regular intervals.

To better achieve the advantageous effect, the plant oil may suitably be at least one waste edible oil (waste edible plant oil).

Although the mechanism for this advantageous effect is not exactly clear, it is believed to be due to the following mechanism of action.

It is considered that in the waste edible oil, the carbonyl groups may be conjugated with the double bonds to cause interaction with filler such as carbon black and, moreover, as the number of double bonds is thus reduced, the plant oil has a lower Tg, so that the tan δ tends to decrease, resulting in improved fuel economy. Furthermore, the use of the waste edible oil also enables reduction of $CO_2$ emissions during the production and transportation of raw materials, resulting in high LCA performance. For these reasons, it is believed that the rubber composition has excellent overall performance in terms of fuel economy and bleed resistance as well as good LCA performance (e.g., reduction of $CO_2$ emissions).

Examples of usable waste edible oils include plant oils in general used as cooking oil which have been degraded during use in heat cooking or other processes. The waste edible oils may contain oils and fats derived from cooked foods, and decomposed or modified products thereof, etc.

Specific examples of the waste edible oils include soybean oil, rapeseed oil, cottonseed oil, sunflower oil, kapok oil, sesame oil, corn oil, rice oil, peanut oil, safflower oil, olive oil, linseed oil, tung oil, castor oil, palm oil, palm kernel oil, coconut oil, etc., and mixtures thereof, all of which have been degraded during use in heat cooking or other processes.

These waste edible oils are usually plant oils consisting of esters of fatty acids and glycerol which have been used and will be disposed of. Here, the fatty acids preferably have a carbon number in the range of 6 to 24, and may further contain 0 to 3 unsaturated bonds in each molecule. Specific examples of the fatty acids include saturated fatty acids such as caproic acid, caprylic acid, capric acid, undecanoic acid, lauric acid, tridecanoic acid, myristic acid, pentadecanoic acid, palmitic acid, margaric acid, stearic acid, nonadecanoic acid, arachidic acid, behenic acid, and lignoceric acid; unsaturated fatty acids such as obtusilic acid, linderic acid, tsuzuic acid, myristoleic acid, palmitoleic acid, petroselinic acid, oleic acid, elaidic acid, vaccenic acid, erucic acid, sorbic acid, linoleic acid, linolelaidic acid, γ-linolenic acid, linolenic acid, and arachidonic acid; and mixtures thereof.

In the rubber composition, the amount of the above-described plant oils per 100 parts by mass of the rubber component content is preferably 1 part by mass or more, more preferably 3 parts by mass or more, still more preferably 5 parts by mass or more, particularly preferably 7 parts by mass or more. The upper limit is preferably 100 parts by mass or less, more preferably 90 parts by mass or less, still more preferably 80 parts by mass or less, particularly preferably 70 parts by mass or less, most preferably 50 parts by mass or less. When the amount is within the range indicated above, the advantageous effect tends to be better achieved.

(Rubber Component)

Examples of rubber components that may be used in the rubber composition include diene rubbers, such as isoprene-based rubbers, polybutadiene rubbers (BR), styrene-butadiene rubbers (SBR), acrylonitrile-butadiene rubbers (NBR), chloroprene rubbers (CR), butyl rubbers (IIR), and styrene-isoprene-butadiene copolymer rubbers (SIBR). Isoprene-based rubbers, BR, and SBR are preferred among these.

The rubber components may be either unmodified or modified rubbers.

The modified rubbers may be any rubber having a functional group interactive with filler such as silica or carbon black. Specific examples include a chain end-modified rubber obtained by modifying at least one chain end of a rubber with a compound (modifier) having the functional group (i.e., a chain end-modified rubber terminated with the functional group); a backbone-modified rubber having the functional group in the backbone; a backbone- and chain end-modified rubber having the functional group in both the backbone and chain end (e.g., a backbone- and chain end-modified rubber in which the backbone has the functional group and at least one chain end is modified with the modifier); and a chain end-modified rubber into which a hydroxy or epoxy group has been introduced by modification (coupling) with a polyfunctional compound having two or more epoxy groups in the molecule. These may be used alone or in combinations of two or more.

Examples of the functional group include functional groups containing at least one atom selected from the group consisting of a nitrogen atom, an oxygen atom, and a silicon atom. These may be used alone or in combinations of two or more.

Specific examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxy, nitrile, pyridyl, alkoxy, hydroxy, oxy, and epoxy groups. These functional groups may be substituted. To more suitably achieve the advantageous effect, amino groups (preferably amino groups whose hydrogen atom is replaced with a C1-C6 alkyl group), alkoxy groups (preferably C1-C6 alkoxy groups), and alkoxysilyl groups (preferably C1-C6 alkoxysilyl groups) are preferred among these.

Examples of isoprene-based rubbers include natural rubbers (NR), polyisoprene rubbers (IR), refined NR, modified NR, and modified IR. Examples of NR and IR include those commonly used in the tire industry, for example, SIR20, RSS #3, and TSR20 all for NR, and IR2200 for IR. Examples of refined NR include deproteinized natural rubbers (DPNR) and highly purified natural rubbers (UPNR). Examples of modified NR include epoxidized natural rubbers (ENR), hydrogenated natural rubbers (HNR), and grafted natural rubbers. Examples of modified IR include epoxidized polyisoprene rubbers, hydrogenated polyisoprene rubbers, and grafted polyisoprene rubbers. These may be used alone or in combinations of two or more.

The amount of isoprene-based rubbers, if present, based on 100% by mass of the rubber component content in the rubber composition is preferably 30% by mass or more, more preferably 40% by mass or more, still more preferably 45% by mass or more. The upper limit of the amount is not limited, but is preferably 90% by mass or less, more preferably 75% by mass or less, still more preferably 60% by mass or less. When the amount is within the range indicated above, the advantageous effect tends to be better achieved.

Any BR may be used. Examples include those commonly used in the tire industry, such as high-cis BR, BR containing 1,2-syndiotactic polybutadiene crystals (SPB-containing BR), polybutadiene rubbers synthesized using rare earth catalysts (rare earth-catalyzed BR), and polybutadiene rubbers modified by tin compounds (tin-modified BR). The BR may be commercially available from Ube Industries, Ltd., JSR Corporation, Asahi Kasei Corporation, Zeon Corporation, etc. These may be used alone or in combinations of two or more.

The BR may be either unmodified or modified BR.

Examples of modified BR include BR having the above-mentioned functional groups.

From the standpoint of ice performance, the cis content of the BR is preferably 80% by mass or higher, more preferably 85% by mass or higher, still more preferably 90% by mass or higher, particularly preferably 95% by mass or higher. Herein, the cis content (cis-1,4-linkage content) is measured by infrared absorption spectrometry or calculated from the signal intensity measured by NMR analysis.

The amount of BR, if present, based on 100% by mass of the rubber component content in the rubber composition is preferably 10% by mass or more, more preferably 30% by mass or more, still more preferably 40% by mass or more. The upper limit is preferably 80% by mass or less, more preferably 70% by mass or less, still more preferably 60% by mass or less. When the amount is within the range indicated above, the advantageous effect tends to be better achieved.

Any SBR may be used, including for example emulsion-polymerized styrene-butadiene rubbers (E-SBR) and solution-polymerized styrene-butadiene rubbers (S-SBR). These may be used alone or in combinations of two or more.

The styrene content of the SBR is preferably 5.0% by mass or higher, more preferably 10.0% by mass or higher, still more preferably 15.0% by mass or higher, particularly preferably 20.0% by mass or higher. Moreover, the upper limit of the styrene content is preferably 60.0% by mass or lower, more preferably 50.0% by mass or lower, still more preferably 40.0% by mass or lower, particularly preferably 30.0% by mass or lower. When the styrene content is within the range indicated above, the advantageous effect tends to be better achieved.

Herein, the styrene content of the SBR is determined by $^1$H-NMR analysis.

The vinyl content of the SBR is preferably 5.0% by mass or higher, more preferably 10.0% by mass or higher, still more preferably 12.0% by mass or higher, particularly preferably 14.0% by mass or higher. The vinyl content is preferably 50.0% by mass or lower, more preferably 30.0% by mass or lower, still more preferably 20.0% by mass or lower, particularly preferably 18.0% by mass or lower. When the vinyl content is within the range indicated above, the advantageous effect tends to be better achieved.

Here, the vinyl content (1,2-butadiene unit content) can be determined by infrared absorption spectrometry.

SBR products manufactured or sold by, for example, Sumitomo Chemical Co., Ltd., JSR Corporation, Asahi Kasei Corporation, Zeon Corporation, etc. may be used as the SBR.

The SBR may be either unmodified or modified SBR.

Examples of modified SBR include SBR having the above-mentioned functional groups.

The amount of SBR, if present, based on 100% by mass of the rubber component content in the rubber composition is preferably 3% by mass or more, more preferably 5% by mass or more, still more preferably 7% by mass or more, but is preferably 30% by mass or less, more preferably 20% by mass or less, still more preferably 10% by mass or less. When the amount is within the range indicated above, the advantageous effect tends to be better achieved.

(Filler)

The rubber composition desirably contains a filler.

Any filler may be used, including materials known in the rubber field. Examples include inorganic fillers such as carbon black, silica, calcium carbonate, talc, alumina, clay, aluminum hydroxide, aluminum oxide, and mica. Carbon black or silica is preferred among these.

In the rubber composition, the amount of fillers (the total amount of fillers) per 100 parts by mass of the rubber component content is preferably 5 parts by mass or more, more preferably 20 parts by mass or more, still more preferably 30 parts by mass or more, particularly preferably 40 parts by mass or more. The upper limit of the amount is preferably 150 parts by mass or less, more preferably 120 parts by mass or less, still more preferably 100 parts by mass or less, particularly preferably 90 parts by mass or less. When the amount is within the range indicated above, the advantageous effect tends to be better achieved.

Non-limiting examples of carbon black that may be used in the rubber composition include N134, N110, N220, N234, N219, N339, N330, N326, N351, N550, and N762. Usable commercial products are available from Asahi Carbon Co., Ltd., Cabot Japan K.K., Tokai Carbon Co., Ltd., Mitsubishi Chemical Corporation, Lion Corporation, NIPPON STEEL Carbon Co., Ltd., Columbia Carbon, etc. These may be used alone or in combinations of two or more.

The nitrogen adsorption specific surface area ($N_2SA$) of the carbon black is preferably 20 $m^2/g$ or more, more preferably 30 $m^2/g$ or more, still more preferably 40 $m^2/g$ or more. The $N_2SA$ is also preferably 200 $m^2/g$ or less, more preferably 150 $m^2/g$ or less, still more preferably 130 $m^2/g$ or less. When the $N_2SA$ is within the range indicated above, the advantageous effect tends to be better achieved.

Here, the nitrogen adsorption specific surface area of the carbon black is determined in accordance with JIS K6217-2:2001.

In the rubber composition, the amount of carbon black per 100 parts by mass of the rubber component content is preferably 5 parts by mass or more, more preferably 10 parts by mass or more, still more preferably 15 parts by mass or more, particularly preferably 20 parts by mass or more. The upper limit is preferably 100 parts by mass or less, more preferably 70 parts by mass or less, still more preferably 50 parts by mass or less. When the amount is within the range indicated above, the advantageous effect tends to be better achieved.

Any silica may be used, and examples include dry silica (silicic anhydride) and wet silica (hydrous silicic acid). These may be used alone or in combinations of two or more. Wet silica is preferred among these because it has a large number of silanol groups.

The silica may be commercially available from, for example, Degussa, Rhodia, Tosoh Silica Corporation, Solvay Japan, Tokuyama Corporation, etc.

The nitrogen adsorption specific surface area ($N_2SA$) of the silica is preferably 50 $m^2/g$ or more, more preferably 100 $m^2/g$ or more, still more preferably 150 $m^2/g$ or more. The $N_2SA$ is also preferably 300 $m^2/g$ or less, more preferably 250 $m^2/g$ or less, still more preferably 230 $m^2/g$ or less. When the $N_2SA$ is within the range indicated above, the advantageous effect tends to be better achieved.

Here, the $N_2SA$ of the silica can be measured in accordance with ASTM D3037-81.

In the rubber composition, the amount of silica per 100 parts by mass of the rubber component content is preferably 5 parts by mass or more, more preferably 10 parts by mass or more, still more preferably 15 parts by mass or more, particularly preferably 20 parts by mass or more. The upper limit is preferably 100 parts by mass or less, more preferably 70 parts by mass or less, still more preferably 50 parts by mass or less. When the amount is within the range indicated above, the advantageous effect tends to be better achieved.

(Silane Coupling Agent)

The rubber composition preferably contains a silane coupling agent.

Any silane coupling agent may be used, and examples include sulfide silane coupling agents such as bis(3-triethoxysilylpropyl) tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl) tetrasulfide, bis(2-triethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. These may be used alone or in combinations of two or more. To better achieve the advantageous effect, sulfide or mercapto silane coupling agents are preferred among these.

The silane coupling agents may be commercially available from, for example, Degussa, Momentive, Shin-Etsu Silicone, Tokyo Chemical Industry Co., Ltd., AZmax. Co., Dow Corning Toray Co., Ltd., etc.

The amount of silane coupling agents per 100 parts by mass of the silica is preferably 3 parts by mass or more, more preferably 5 parts by mass or more, but is preferably 25 parts by mass or less, more preferably 20 parts by mass or less, still more preferably 15 parts by mass or less. When the amount is within the range indicated above, the advantageous effect tends to be better achieved.

(Other Plasticizers)

In addition to the above-described plant oils, the rubber composition may contain other plasticizers.

Examples of such other plasticizers include liquid plasticizers (plasticizers that are liquid at 23° C.) other than the above-described plant oils, and resins (resins that are solid at 23° C.)

In the rubber composition, the amount of plasticizers (the total amount of plasticizers) per 100 parts by mass of the rubber component content is preferably 1 part by mass or more, more preferably 3 parts by mass or more, still more preferably 5 parts by mass or more, particularly preferably 7 parts by mass or more. The upper limit is preferably 100 parts by mass or less, more preferably 90 parts by mass or less, still more preferably 80 parts by mass or less, particularly preferably 70 parts by mass or less. When the amount is within the range indicated above, the advantageous effect tends to be better achieved.

Non-limiting examples of liquid plasticizers (plasticizers that are liquid at 23° C.) other than the above-described plant oils include process oils, liquid polymers (e.g., liquid resins, liquid diene polymers, liquid farnesene polymers), and plant oils other than the above-described plant oils. These may be used alone or in combinations of two or more.

In the rubber composition, the amount of liquid plasticizers (the total amount of liquid plasticizers) per 100 parts by mass of the rubber component content is preferably 1 part by mass or more, more preferably 3 parts by mass or more, still more preferably 5 parts by mass or more, particularly preferably 7 parts by mass or more. The upper limit is preferably 100 parts by mass or less, more preferably 90 parts by mass or less, still more preferably 80 parts by mass or less, particularly preferably 70 parts by mass or less. When the amount is within the range indicated above, the advantageous effect tends to be better achieved. Here, the amount of liquid plasticizers includes the amount of the oils contained in the oil extended rubbers, if used.

Examples of process oils include paraffinic process oils, aromatic process oils, and naphthenic process oils. Usable commercial products are available from Idemitsu Kosan Co., Ltd., Sankyo Yuka Kogyo K.K., ENEOS Corporation, Olisoy, H&R, Hokoku Corporation, Showa Shell Sekiyu K.K., Fuji Kosan Co., Ltd., The Nisshin Oillio Group, Ltd., etc.

Examples of liquid resins include liquid terpene resins (including terpene phenol resins and aromatic modified terpene resins), rosin resins, styrene resins, C5 resins, C9 resins, C5/C9 resins, dicyclopentadiene (DCPD) resins, coumarone-indene resins (including resins based on coumarone or indene alone), phenol resins, olefin resins, polyurethane resins, and acrylic resins. Hydrogenated products of the foregoing resins may also be used.

Examples of liquid diene polymers include liquid styrene-butadiene copolymers (liquid SBR), liquid polybutadiene polymers (liquid BR), liquid polyisoprene polymers (liquid IR), liquid styrene-isoprene copolymers (liquid SIR), liquid styrene-butadiene-styrene block copolymers (liquid SBS block polymers), liquid styrene-isoprene-styrene block copolymers (liquid SIS block polymers), liquid farnesene polymers, and liquid farnesene-butadiene copolymers, all of which are liquid at 23° C. The chain end or backbone of these polymers may be modified with a polar group. Moreover, hydrogenated products of these polymers may also be used.

Examples of resins (resins that are solid at 23° C.) that may be used in the rubber composition include aromatic vinyl polymers, coumarone-indene resins, coumarone resins, indene resins, phenol resins, rosin resins, petroleum resins, terpene resins, and acrylic resins, all of which are solid at 23° C. The resins may also be hydrogenated. These may be used alone or in combinations of two or more. Aromatic vinyl polymers, petroleum resins, and terpene resins are preferred among these.

In the rubber composition, the amount of the above-described resins per 100 parts by mass of the rubber component content is preferably 5 parts by mass or more, more preferably 10 parts by mass or more, still more preferably 15 parts by mass or more, particularly preferably 20 parts by mass or more. The upper limit is preferably 60 parts by mass or less, more preferably 40 parts by mass or less, still more preferably 30 parts by mass or less. When the amount is within the range indicated above, the advantageous effect tends to be better achieved.

The softening point of the above-described resins is preferably 50° C. or higher, more preferably 55° C. or higher, still more preferably 60° C. or higher. The upper limit is preferably 160° C. or lower, more preferably 150° C. or lower, still more preferably 145° C. or lower. When the softening point is within the range indicated above, the advantageous effect tends to be better achieved. Here, the softening point of the resins is determined in accordance with JIS K 6220-1:2001 using a ring and ball softening point measuring apparatus and defined as the temperature at which the ball drops down.

The term "aromatic vinyl polymers" refers to polymers which contain aromatic vinyl monomers as structural units. Examples include resins produced by polymerization of α-methylstyrene and/or styrene, specifically styrene homopolymers (styrene resins), α-methylstyrene homopolymers (α-methylstyrene resins), copolymers of α-methylstyrene and styrene, and copolymers of styrene and other monomers.

The term "coumarone-indene resins" refers to resins which contain coumarone and indene as the main monomer components forming the skeleton (backbone) of the resins. Examples of monomer components which may be contained in the skeleton in addition to coumarone and indene include styrene, α-methylstyrene, methylindene, and vinyltoluene.

The term "coumarone resins" refers to resins which contain coumarone as the main monomer component forming the skeleton (backbone) of the resins.

The term "indene resins" refers to resins which contain indene as the main monomer component forming the skeleton (backbone) of the resins.

Examples of phenol resins include known phenol resins such as polymers produced by reaction of phenol with aldehydes such as formaldehyde, acetaldehyde, or furfural using acid or alkali catalysts. Those produced by reaction using acid catalysts (e.g., novolac-type phenol resins) are preferred among these.

Examples of rosin resins include rosin-based resins as typified by natural rosins, polymerized rosins, modified rosins, esterified compounds thereof, and hydrogenated products thereof.

Examples of petroleum resins include C5 resins, C9 resins, C5/C9 resins, and dicyclopentadiene (DCPD) resins, and hydrogenated products thereof. DCPD resins or hydrogenated DCPD resins are preferred among these.

The term "terpene resins" refers to polymers which contain terpenes as structural units. Examples include polyterpene resins produced by polymerization of terpene compounds, and aromatic modified terpene resins produced by polymerization of terpene compounds and aromatic compounds. Examples of the aromatic modified terpene resins include terpene phenol resins made from terpene compounds and phenolic compounds, terpene styrene resins made from terpene compounds and styrene compounds, and terpene phenol styrene resins made from terpene compounds, phenolic compounds, and styrene compounds. Examples of the terpene compounds used here include α-pinene and β-pinene; examples of the phenolic compounds include phenol and bisphenol A; and examples of the aromatic compounds include styrene compounds such as styrene and α-methylstyrene.

The term "acrylic resins" refers to polymers which contain acrylic monomers as structural units. Examples include styrene acrylic resins such as styrene acrylic resins containing carboxy groups which are produced by copolymerization of aromatic vinyl monomer components and acrylic monomer components. Solvent-free, carboxy group-containing styrene acrylic resins are suitable among these.

The plasticizers may be commercially available from, for example, Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., ENEOS Corporation, Arakawa Chemical Industries, Ltd., Taoka Chemical Co., Ltd., etc.

(Other Materials)

The rubber composition preferably contains sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be commercially available from, for example, Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc.

The amount of sulfur per 100 parts by mass of the rubber component content is preferably 0.1 parts by mass or more, more preferably 0.5 parts by mass or more, still more preferably 0.8 parts by mass or more. The amount is also preferably 10 parts by mass or less, more preferably 7 parts by mass or less, still more preferably 5 parts by mass or less, particularly preferably 3 parts by mass or less, most preferably 2 parts by mass or less. When the amount is within the range indicated above, the advantageous effect tends to be better achieved.

The rubber composition preferably contains a vulcanization accelerator.

Examples of the vulcanization accelerator include thiazole vulcanization accelerators such as 2-mercaptobenzothiazole and di-2-benzothiazolyl disulfide; thiuram vulcanization accelerators such as tetramethylthiuram disulfide (TMTD), tetrabenzylthiuram disulfide (TBzTD), and tetrakis(2-ethylhexyl)thiuram disulfide TOT-N); sulfenamide vulcanization accelerators such as N-cyclohexyl-2-benzothiazolylsulfenamide, N-t-butyl-2-benzothiazolylsulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. Sulfenamide vulcanization accelerators are preferred among these.

The vulcanization accelerators may be commercially available from, for example, Kawaguchi Chemical Industry Co., Ltd., Ouchi Shinko Chemical Industrial Co., Ltd., Rhein Chemie, etc.

The amount of vulcanization accelerators per 100 parts by mass of the rubber component content is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition preferably contains stearic acid.

The stearic acid used may be a conventional one, examples of which include commercial products of NOF Corporation, Kao Corporation, FUJIFILM Wako Pure Chemical Corporation, Chiba Fatty Acid Co., Ltd., etc.

The amount of stearic acid per 100 parts by mass of the rubber component content is preferably 0.5 parts by mass or more, more preferably 1 part by mass or more. The amount is also preferably 5 parts by mass or less, more preferably 3 parts by mass or less. When the amount is within the range indicated above, the advantageous effect tends to be better achieved.

The rubber composition may contain zinc oxide.

The zinc oxide used may be a conventional one, examples of which include commercial products of Mitsui Mining & Smelting Co., Ltd., Toho Zinc Co., Ltd., HakusuiTech Co., Ltd., Seido Chemical Industry Co., Ltd., Sakai Chemical Industry Co., Ltd., etc.

The amount of zinc oxide per 100 parts by mass of the rubber component content is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain an antioxidant.

Examples of the antioxidant include naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as polymerized 2,2,4-trimethyl-1,2-dihydroquinoline; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)propionate]methane. These may be used alone or in combinations of two or more. Preferred among these are p-phenylenediamine or quinoline antioxidants, with p-phenylenediamine antioxidants being more preferred.

The antioxidants may be commercially available from, for example, Seiko Chemical Co., Ltd., Sumitomo Chemical Co., Ltd., Ouchi Shinko Chemical Industrial Co., Ltd., Flexsys, etc.

The amount of antioxidants per 100 parts by mass of the rubber component content is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain a wax.

Non-limiting examples of the wax include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more.

The waxes may be commercially available from, for example, Ouchi Shinko Chemical Industrial Co., Ltd., Nippon Seiro Co., Ltd., Seiko Chemical Co., Ltd., etc.

The amount of waxes per 100 parts by mass of the rubber component content is preferably 0.5 parts by mass or more, more preferably 1 part by mass or more. The amount is also preferably 10 parts by mass or less, more preferably 7 parts by mass or less. When the amount is within the range indicated above, the advantageous effect tends to be better achieved.

In addition to the above-described components, the rubber composition may contain additives commonly used in the tire industry. Examples of such additives include vulcanizing agents other than sulfur (for example, organic crosslinking agents, organic peroxides). The amounts of these components are each preferably 0.1 parts by mass or more, but preferably 200 parts by mass or less per 100 parts by mass of the rubber component content.

The rubber composition may be prepared, for example, by kneading the above-described components using a rubber kneading machine such as an open roll mill or a Banbury mixer, and then vulcanizing the kneaded mixture.

The kneading conditions are as follows: in a base kneading step of kneading additives other than crosslinking agents (vulcanizing agents) and vulcanization accelerators, the kneading temperature is usually 100 to 180° C., preferably 120 to 170° C., while in a final kneading step of kneading vulcanizing agents and vulcanization accelerators, the kneading temperature is usually 120° C. or lower, preferably 80 to 110° C. Then, the composition obtained after kneading vulcanizing agents and vulcanization accelerators is usually vulcanized by press vulcanization, for example. The vulcanization temperature is usually 140 to 190° C., preferably 150 to 185° C.

For example, the rubber composition may be used in tire components (as a tire rubber composition).

Non-limiting examples of the tire components include treads (cap treads, base treads), sidewalls, bead apexes, clinch apexes, innerliners, undertreads, breaker toppings, ply toppings, and any of various other tire components. Preferred among these are sidewalls, innerliners, and cap treads, with sidewalls and/or innerliners being particularly preferred.

The tire of the present disclosure can be produced from the above-described rubber composition by usual methods. Specifically, the unvulcanized rubber composition containing additives as needed may be extruded into the shape of a tire component, and then formed and assembled with other tire components in a usual manner on a tire building machine to build an unvulcanized tire, which may then be heated and pressurized in a vulcanizer to produce a tire.

The tire may be, for example, but not limited to, a pneumatic tire, a solid tire, an airless tire, etc. The tire is preferably a pneumatic tire, among others.

The tire may be used as a passenger car tire, a large passenger car tire, a large SUV tire, a heavy duty tire (e.g., a truck and bus tire), a two-wheeled vehicle tire, a racing tire, a winter tire (a studless winter tire, a snow tire, a cold weather tire, a studded tire), an all-season tire, a run-flat tire, an aircraft tire, a mining car tire, etc.

Examples

The present disclosure will be specifically described with reference to, but not limited to, examples.

The chemicals used in the examples and comparative examples are listed below.

NR: RSS*3
BR: polybutadiene rubber UBEPOL BR150B (cis content: 97% by mass, $ML_{1+4}$ (100° C.): 40, Mw/Mn: 3.3) available from Ube Industries, Ltd.
Carbon black: SEAST N550 ($N_2SA$: 41 $m^2/g$) available from Mitsubishi Chemical Corporation
Silica: ULTRASIL VN3 ($N_2SA$: 175 $m^2/g$) available from Evonik-Degussa
Silane coupling agent: Si69 (bis(3-triethoxysilylpropyl) tetrasulfide) available from Evonik-Degussa
Wax: Ozoace 0355 available from Nippon Seiro Co., Ltd.
Antioxidant: NOCRAC 6C (N-(1,3-dimethylbutyl)-N-phenyl-p-phenylenediamine) available from Ouchi Shinko Chemical Industrial Co., Ltd.
Plant oils 1 to 8: waste edible oils having the properties indicated in Table 1
Mineral oil: PS-32 available from Idemitsu Kosan Co., Ltd.
Plant oil 9: (new) plant oil having the properties indicated in Table 1
Stearic acid: stearic acid "KIRI" available from NOF Corporation
Zinc oxide: zinc oxide #2 available from Mitsui Mining & Smelting Co., Ltd.
Sulfur: powdered sulfur available from Tsurumi Chemical Industry Co., Ltd.
Vulcanization accelerator: NOCCELER NS (N-tert-butyl-2-benzothiazolylsulfenamide) available from Ouchi Shinko Chemical Industrial Co., Ltd.

TABLE 1

| | Plant oil | | | | | | | | |
|---|---|---|---|---|---|---|---|---|---|
| | 1 | 2 | 3 | 4 | 5 | 6 | 7 | 8 | 9 |
| Plant oil type | Waste edible oil (Purification method: Strainer + Filter press) | Waste edible oil (Purification method: Strainer + Filter press) | Waste edible oil (Purification method: Strainer + Filter press) | Waste edible oil (Purification method: Strainer + Filter press) | Waste edible oil (Purification method: Strainer only) | Waste edible oil (Purification method: Strainer only) | Waste edible oil (Purification method: Strainer + Filter press) | Waste edible oil (Purification method: Strainer + Filter press) | (New) Plant oil (Soybean oil) |
| State at temperature of 23° C. | Liquid | Liquid | Liquid | Liquid | Liquid | Liquid | Liquid | Liquid | Liquid |
| GPC Mw | 1300 | 1100 | 1100 | 1100 | 1100 | 1100 | 1200 | 1200 | 1200 |
| Percentage (%) of peak area corresponding to molecular weight of 800 or more in GPC molecular weight distribution curve | 100 | 95 | 95 | 95 | 95 | 95 | 95 | 95 | 95 |
| Absorbance at wavelength of 450 nm measured with spectrophotometer | 0.24 | 0.18 | 0.41 | 0.60 | 0.21 | 0.42 | 0.60 | 0.26 | 0.03 |
| Absorbance at wavelength of 600 nm measured with spectrophotometer | 0.04 | 0.01 | 0.05 | 0.10 | 0.08 | 0.02 | 0.10 | 0.11 | 0.01 |
| Absorbance at wavelength of 450 nm − Absorbance at wavelength of 600 nm | 0.20 | 0.17 | 0.36 | 0.50 | 0.13 | 0.40 | 0.50 | 0.15 | 0.02 |
| (Weight after passing through 20 mesh plain weave wire cloth)/(Weight before passing through 20 mesh plain weave wire cloth) × 100 | 100 | 100 | 100 | 100 | 100 | 100 | 100 | 100 | 100 |

Here, the molecular weight and absorbance of the plant oils were measured as described below. Moreover, the weights before and after passing through 20 mesh plain weave wire cloth refer to the weights before and after passing 100 g of the plant oil at a temperature of 23 to 30° C. through 20 mesh plain weave wire cloth.

<Molecular Weight Analysis>

The weight average molecular weight (Mw) of each plant oil was determined by gel permeation chromatography (GPC) (GPC-8000 series available from Tosoh Corporation, detector: differential refractometer, column: TSKGEL SUPERMULTIPORE HZ-M available from Tosoh Corporation) and calibrated with polystyrene standards. Moreover, the peak area of components having a molecular weight of 800 or more was determined from the molecular weight distribution curve obtained by GPC.

<Absorbance Measurement>

Each plant oil (100 μL) was 3-fold diluted with THF (200 μL) to prepare a sample (diluted plant oil). The sample was measured for absorbance at 450 nm and 600 nm with a spectrophotometer (Thermo Scientific), and the value of "Absorbance at wavelength of 450 nm−Absorbance at wavelength of 600 nm" was calculated.

<Preparation of Vulcanized Rubber Composition and Test Tire>

The chemicals other than the sulfur and vulcanization accelerator were kneaded using a 1.7 L Banbury mixer according to the formulation recipe shown in Table 2. Then, the kneaded mixture was combined with the sulfur and vulcanization accelerator, and they were kneaded using an open roll mill to prepare an unvulcanized rubber composition. The unvulcanized rubber composition was then press-vulcanized using a 2 mm-thick die at 170° C. for 15 minutes to prepare a vulcanized rubber composition (vulcanized rubber sheet).

Separately, the unvulcanized rubber composition prepared as above was formed into the shape of a sidewall and assembled with other tire components, followed by vulcanization at 170° C. for 15 minutes to prepare a test tire.

The vulcanized rubber compositions and test tires prepared as above were evaluated as described below. Table 2 shows the results. Comparative Example 1 is used as a standard of comparison in Table 2.

<Viscoelastic Testing (Fuel Economy)>

The loss tangent (tan δ) of each vulcanized rubber slab sheet was measured using a viscoelastic spectrometer VES (Iwamoto Seisakusho Co., Ltd.) at a temperature of 70° C., an initial strain of 10%, a dynamic strain of 2%, and a frequency of 10 Hz, and expressed as an index of rolling resistance using the equation below, where the rolling resistance index of the standard comparative example is set equal to 100. A higher rolling resistance index indicates a lower rolling resistance and better fuel economy.

(Rolling resistance index)=(tan δ of standard comparative example)/(tan δ of each formulation example)×100

<Bleed Resistance>

Each test tire was mounted on a car. After running 8000 km, the acetone extractable content of the rubber in the sidewall portion of the test tire was measured. The reciprocal of the value of "Acetone extractable content before running−Acetone extractable content after running" was calculated and expressed as an index (bleed resistance index) relative to that of the standard comparative example taken as 100. A higher index indicates less bleeding and better bleed resistance.

<LCA Performance>

LCA performance was evaluated according to the following three-point scale.

Good: $CO_2$ emissions can be greatly reduced.
Fair: $CO_2$ emissions can be reduced.
Poor: $CO_2$ emissions are high.

TABLE 2

| | | Example | | | | | | | | | | Comparative Example | |
|---|---|---|---|---|---|---|---|---|---|---|---|---|---|
| | | 1 | 2 | 3 | 4 | 5 | 6 | 7 | 8 | 9 | 10 | 1 | 2 |
| Amount (parts by mass) | NR | 60 | 60 | 60 | 60 | 60 | 60 | 60 | 60 | 60 | 60 | 60 | 60 |
| | BR | 40 | 40 | 40 | 40 | 40 | 40 | 40 | 40 | 40 | 40 | 40 | 40 |
| | Carbon black | 20 | 20 | 20 | 20 | 20 | 20 | 20 | 20 | 20 | 20 | 20 | 20 |
| | Silica | 20 | 20 | 20 | 20 | 20 | 20 | 20 | 20 | 20 | 20 | 20 | 20 |
| | Silane coupling agent | 1.6 | 1.6 | 1.6 | 1.6 | 1.6 | 1.6 | 1.6 | 1.6 | 1.6 | 1.6 | 1.6 | 1.6 |
| | Wax | 5 | 5 | 5 | 5 | 5 | 5 | 5 | 5 | 5 | 5 | 5 | 5 |
| | Antioxidant | 2 | 2 | 2 | 2 | 2 | 2 | 2 | 2 | 2 | 2 | 2 | 2 |
| | Plant oil 1 | 5 | 3 | 10 | | | | | | | | | |
| | Plant oil 2 | | | | 5 | | | | | | | | |
| | Plant oil 3 | | | | | 5 | | | | | | | |
| | Plant oil 4 | | | | | | 5 | | | | | | |
| | Plant oil 5 | | | | | | | 5 | | | | | |
| | Plant oil 6 | | | | | | | | 5 | | | | |
| | Plant oil 7 | | | | | | | | | 5 | | | |
| | Plant oil 8 | | | | | | | | | | 5 | | |
| | Mineral oil | | | | | | | | | | | 5 | |
| | Plant oil 9 | | | | | | | | | | | | 10 |
| | Stearic acid | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 |
| | Sulfur | 1.5 | 1.5 | 1.5 | 1.5 | 1.5 | 1.5 | 1.5 | 1.5 | 1.5 | 1.5 | 1.5 | 1.5 |
| | Vulcanization accelerator | 1 | 1 | 1 | 1 | 1 | 1 | 1 | 1 | 1 | 1 | 1 | 1 |
| Evaluation | (a) Fuel economy | 98 | 100 | 96 | 94 | 93 | 95 | 99 | 96 | 97 | 97 | 100 | 75 |
| | (b) Bleed resistance | 167 | 190 | 120 | 160 | 140 | 181 | 169 | 291 | 151 | 158 | 100 | 90 |
| | Overall performance (=(a) + (b)) | 265 | 290 | 216 | 254 | 233 | 276 | 268 | 387 | 248 | 255 | 200 | 165 |
| | LCA performance | Good | Good | Good | Good | Good | Good | Good | Good | Good | Good | Poor | Fair |

As shown in Tables 1 and 2, excellent overall performance in terms of fuel economy and bleed resistance (as expressed as the sum of two indices of fuel economy and bleed resistance) as well as good LCA performance were exhibited by the rubber compositions of the examples containing a plant oil satisfying conditions (1) to (4).

Exemplary embodiments of the present disclosure include:

Embodiment 1. A tire, including a rubber composition containing at least one plant oil, the plant oil satisfying the following conditions (1) to (4):
 (1) the plant oil is liquid at a temperature of 23° C.;
 (2) the plant oil has a GPC weight average molecular weight of more than 800;
 (3) when the plant oil is 3-fold diluted with THF, the diluted plant oil satisfies the following relationship with respect to absorbances at wavelengths of 450 nm and 600 nm measured with a spectrophotometer:

Absorbance at wavelength of 450 nm−Absorbance at wavelength of 600 nm≥0.05; and (4) the plant oil satisfies the following relationship with respect to weights before and after passing 100 g of the plant oil at a temperature of 23 to 30° C. through 20 mesh plain weave wire cloth:

(Weight after passing through plain weave wire cloth)/(Weight before passing through plain weave wire cloth)×100≥99.0.

Embodiment 2. The tire according to Embodiment 1, wherein the plant oil has a GPC molecular weight distribution curve in which a peak area corresponding to a molecular weight of 800 or more is 95% or greater.

Embodiment 3. The tire according to Embodiment 1 or 2, wherein the plant oil is at least one waste edible oil.

Embodiment 4. The tire according to any one of Embodiments 1 to 3,
 wherein the plant oil is present in an amount of 1 to 100 parts by mass per 100 parts by mass of a rubber component content in the rubber composition.

Embodiment 5. The tire according to any one of Embodiments 1 to 4,
 wherein the rubber composition is at least one of a sidewall rubber composition or an innerliner rubber composition.

The invention claimed is:

1. A tire, comprising a rubber composition comprising at least one plant oil, the plant oil satisfying the following conditions (1) to (4):
 (1) the plant oil is liquid at a temperature of 23° C.;
 (2) the plant oil has a GPC weight average molecular weight of more than 800;
 (3) when the plant oil is 3-fold diluted with THF, the diluted plant oil satisfies the following relationship with respect to absorbances at wavelengths of 450 nm and 600 nm measured with a spectrophotometer:

Absorbance at wavelength of 450 nm−Absorbance at wavelength of 600 nm≥0.05; and (4) the plant oil satisfies the following relationship with respect to weight in grams before and after passing 100 g of the plant oil at a temperature of 23 to 30° C. through 20 mesh plain weave wire cloth:

(Weight after passing through plain weave wire cloth)/(Weight before passing through plain weave wire cloth)×100≥99.0.

2. The tire according to claim 1, wherein the plant oil has a GPC molecular weight distribution curve in which a peak area corresponding to a molecular weight of 800 or more is 95% or greater.

3. The tire according to claim 1, wherein the plant oil is at least one waste edible oil.

4. The tire according to claim 1, wherein the plant oil is present in an amount of 1 to 100 parts by mass per 100 parts by mass of a rubber component content in the rubber composition.

5. The tire according to claim 1, wherein the rubber composition is at least one of a sidewall rubber composition or an innerliner rubber composition.

* * * * *